United States Patent
Kanne et al.

[11] Patent Number: 6,153,804
[45] Date of Patent: *Nov. 28, 2000

[54] PRODUCTION OF CYCLOPENTANE AND/OR CYCLOPENTENE FROM PARTIALLY HYDROGENATED PYROLYSIS GASOLINE

[75] Inventors: Ulrich Kanne, Frankenthal; Jürgen Heners, Bad Dürkheim; Thomas Krug, Worms, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,284

[22] Filed: Mar. 18, 1997

[30] Foreign Application Priority Data

Apr. 4, 1996 [DE] Germany .......................... 196 136 17

[51] Int. Cl.$^7$ .............................. C07C 7/04; C07C 5/05; C07C 4/22
[52] U.S. Cl. .......................... 585/264; 585/256; 585/800; 585/803; 585/20; 585/23; 208/67; 208/100; 208/103
[58] Field of Search .................. 585/800, 803, 585/264, 20, 23, 256; 208/100, 103, 67; 203/81

[56] References Cited

U.S. PATENT DOCUMENTS

| | | |
|---|---|---|
| 2,420,030 | 5/1947 | Brandon .................... 208/67 |
| 2,459,403 | 1/1949 | Ahrens .................... 585/803 |
| 2,540,318 | 2/1951 | Birch et al. .............. 203/81 |
| 2,813,134 | 11/1957 | Johnson .................. 203/81 |
| 3,140,243 | 7/1964 | Feder et al. .............. 203/81 |
| 3,370,003 | 2/1968 | Borst, Jr. ................ 203/81 |
| 3,409,514 | 11/1968 | Drapeau et al. .......... 203/81 |
| 3,565,963 | 2/1971 | Tabler et al. ............ 585/265 |
| 3,598,877 | 8/1971 | Fountain et al. ........ 585/256 |
| 3,686,349 | 8/1972 | Schliebs et al. ........ 203/81 |
| 3,763,254 | 10/1973 | Engelhard et al. ...... 585/256 |
| 3,994,986 | 11/1976 | Koto et al. .............. 585/256 |
| 4,048,242 | 9/1977 | Lauer et al. ............ 585/256 |

FOREIGN PATENT DOCUMENTS

| | | | |
|---|---|---|---|
| 204471 | 11/1983 | Germany | 585/800 |
| 204472 | 11/1983 | Germany | 585/800 |
| 253993 | 2/1988 | Germany | 585/800 |
| 1248463 | 10/1971 | United Kingdom . | |

Primary Examiner—Walter D. Griffin
Attorney, Agent, or Firm—Keil & Weinkauf

[57] ABSTRACT

A process for producing cyclopentane and cyclopentene by fractional distillation of partly hydrogenated pyrolysis gasoline, in which (a) partly hydrogenated pyrolysis gasoline is fractionally distilled in a first distillation column, (b) a $C_5$ hydrocarbon mixture containing at least 40% of cyclopentane and cyclopentene is taken off from the distillation column as a sidestream at a suitable tray, and (c) the $C_5$ hydrocarbon mixture is further fractionally distilled into cyclopentane and cyclopentene in a second distillation column.

16 Claims, 4 Drawing Sheets

PRODUCTION OF CYCLOPENTANE AND/OR CYCLOPENTENE FROM PARTIALLY HYDROGENATED PYROLYSIS GASOLINE

FIELD OF THE INVENTION

The invention relates to a process for producing cyclopentane and/or cyclopentene and also n-/isopentane mixtures in varying ratios from partially hydrogenated pyrolysis gasoline from a steam cracker by optimized combination of distillation and hydrogenation steps.

Cyclopentane is used as a substitute, for example, for the CFCs and HCFCs, which are of concern with regard to damage to the atmosphere, as blowing agent for polyurethane systems for producing rigid foams for insulating refrigerators.

Cyclopentene serves as an important starting compound in the synthesis of a number of interesting secondary products.

n-/Isopentane mixtures serve as solvents for foaming polymers, such as polystyrene and phenol resins, and also as blowing agents for aerosols.

Pyrolysis gasoline arising in the steam cracking of naphtha, prior to its workup by distillation, is subjected to selective hydrogenation to convert the dienes and acetylenes present therein selectively into the corresponding alkanes and alkenes.

The pyrolysis gasoline is generally worked up to isolate the $C_6$–$C_8$ cut which is important for further chemical syntheses and contains the aromatic hydrocarbons, such as benzene, toluene and the xylenes. For this purpose, in a distillation column, the $C_5$ cut, which, inter alia, contains a mixture of cyclopentane and cyclopentene at a total amount of from 15 to 20% by weight, is removed overhead.

DESCRIPTION OF THE RELATED PRIOR ART

Japanese Patent JP 03153636 A2 describes the targeted production of cyclopentane from a $C_5$ fraction of the thermal naphtha cracking which contains di- and monoolefins (eg. 1,3-pentadiene and cyclopentene). After a first catalytic hydrogenation, a mixture of 7.9% cyclopentane; 18.7% cyclopentene ($\Sigma$ cyclo-$C_5$ 26.6%) and 65% 1,3-pentadiene is obtained. To eliminate the interfering dienes, this mixture is subjected to polymerization with $AlCl_3$ where, after the polymers and catalyst lave been removed, a product mixture containing 32% cyclopentane; 34% cyclopentene and 2% 1,3-pentadiene is obtained. Subsequent catalytic hydrogenation on a Pd catalyst gives 95% conversion of the cyclopentene to cyclopentane.

The production of cyclopentene from a diene-containing $C_5$ hydrocarbon mixture likewise originating from the naphtha cracking is described in French Patent 1.588.428. In this process, pyrolysis gases from the cracking process having a high diene content (25% dienes; 1% cyclopentene; 4.6% cyclopentadiene; and 0.52% cyclopentane) are selectively hydrogenated on an Ni catalyst to convert the diolefins present to monoolefins. The hydrogenation product, comprising 3.5% dienes; 4.8% cyclopentene; 0.9% cyclopentadiene and 0.54% cyclopentane, is subjected to three successive continuous column distillations, in order to isolate in this manner 90% of the cyclopentene at a purity of greater than 97%.

The targeted isolation of cyclopentane and/or cyclopentene from mixtures of starting materials which contain the desired cyclic $C_5$ hydrocarbons only at low concentrations and having a high content of interfering dienes is too complex.

SUMMARY OF THE INVENTION

It is an object of the present invention to develop a process for producing cyclopentane in a purity of more than 95% by weight and/or cyclopentene and also n-/isopentane mixtures in varying ratios from $C_5$ mixtures which have been enriched to a greater extent than hitherto and are diene-free, so that one process step, polymerization on $AlCl_3$, can be omitted.

We have found that this object is achieved according to the invention by a process which comprises taking off from a distillation column, in which the partially hydrogenated pyrolysis gasoline is fractionated, as a sidestream at a suitable tray, a $C_5$ hydrocarbon mixture having an elevated concentration of cyclopentane and cyclopentene, either fractionating this mixture into cyclopentane and cyclopentene by fractional distillation or subjecting it to a catalytic hydrogenation and subsequent fractional distillation to produce cyclopentane.

DESCRIPTION OF THE PREFERRED EMBODIMENT(S)

In a particular embodiment of the novel process, the $C_5$ hydrocarbon mixture having an elevated concentration of cyclopentane and cyclopentene is taken off from the distillation column as a liquid sidestream about 5 trays below the top takeoff to about 5 trays above the feed, in particular about 10 trays below the top takeoff to about 10 trays above the feed. According to a preferred embodiment of the novel process, a 60-tray column is used, for example, the feed being at tray 30 and the side takeoff at tray 45, with the column operating at 1.7 bar, for example. This sidestream contains, in the $C_5$ hydrocarbon mixture, cyclopentene (from approximately 10 to 30% by weight) and cyclopentane (from approximately 10 to 30% by weight) in markedly higher concentrations than in the top product. At the same time, in this manner, the residual lower-boiling $C_3$ and $C_4$ hydrocarbons which substantially pass overhead and which interfere with the further processing can be minimized. Selecting the optimum takeoff tray limits to a minimum the concentration of the higher boiling $C_6$ components which are of importance in setting the specification of the cyclopentane.

The mixture containing $\Sigma$ cyclopentane/cyclopentene >40% taken off in the sidestream is fed to a catalytic hydrogenation stage, and its cyclopentene is converted to cyclopentane at from about 40° C. to 180° C. and from 10 to 40 bar, and the accompanying olefins are also converted to aliphatics. The subsequent distillation is considerably simplified in this manner. The low-boilers (n-/isopentane) and $C_6$ hydrocarbons are removed in a concluding distillation step.

Alternatively to hydrogenating the unsaturated hydrocarbons, including cyclopentene, this can be isolated in a mixture with cyclopentane for further syntheses, by working up the approximately 40% pure cyclo-$C_5$ mixture, which primarily arises in the sidestream of the column, by distillation. This produces a from approximately 60 to 70% pure cyclopentene, eg., which can be used without problem in subsequent reactions. Higher concentrations of cyclopentene (>90% by weight) can be obtained by further removal of the cyclopentane present by distillation.

In the case of appropriate composition of the $C_5$ cut arising in the course of naphtha cracking, cyclopentane production can be utilized to remove, as described above, an n-/isopentane mixture in the desired ratio in the final distillation.

In a further particular embodiment of the novel process, in the fractional distillation subsequent to the catalytic hydrogenation, this n-/isopentane mixture is taken off in the desired ratio as a liquid sidestream about 10 trays below the top takeoff to about 10 trays above the feed. In this case, a 70-tray column, eg., is used, the feed being made at tray 25 and the liquid sidestream at tray 45.

The novel process is described in more detail below with reference to FIGS. 1 to 4.

Figure 1:
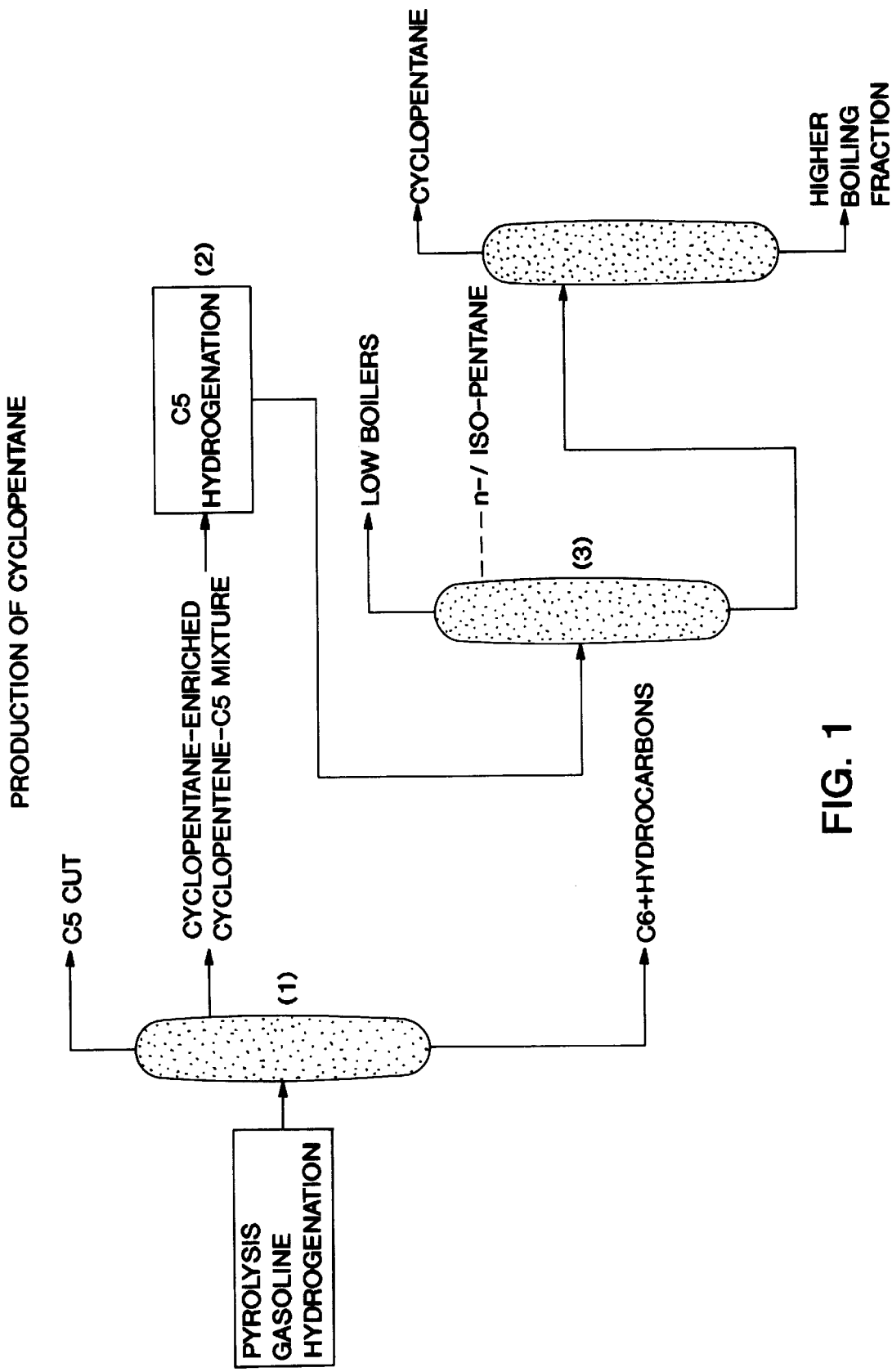
FIG. 1 shows the schematic course of the process, pyrolysis gasoline arising in the steam cracking of naphtha being first subjected to selective hydrogenation, for selective conversion of the dienes and acetylenes present to the corresponding alkanes and alkenes. The resulting partially hydrogenated product is subjected to a fractional distillation in a column (1), a cyclopentane- and cyclopentene-rich $C_5$ hydrocarbon mixture being taken off as a sidestream at a suitable tray, eg. the 45th tray of a 60-tray column. This mixture can either be further processed by fractional distillation to produce cyclopentene or can be fed to a catalytic hydrogenation (2) stage, where the cyclopentene present is converted to cyclopentane, and the accompanying olefins are also converted to aliphatics. The final distillation is performed in a two-column system (3). The mixture of aliphatics coming from the hydrogenation is fractionated in such a manner that the low boilers are taken off overhead in the first distillation column after the hydrogenation. At a suitable point in the enrichment part, eg. the 45th tray in the case of a 70-tray column, in which the feed is at tray 25, for instance, an n-/isopentane mixture is taken off in the desired ratio (eg. 4:1) as a liquid sidestream. The higher-boiling fraction is transferred from the bottom of the first column to a second column, to establish the preset cyclopentane specification there.
Figure 2:
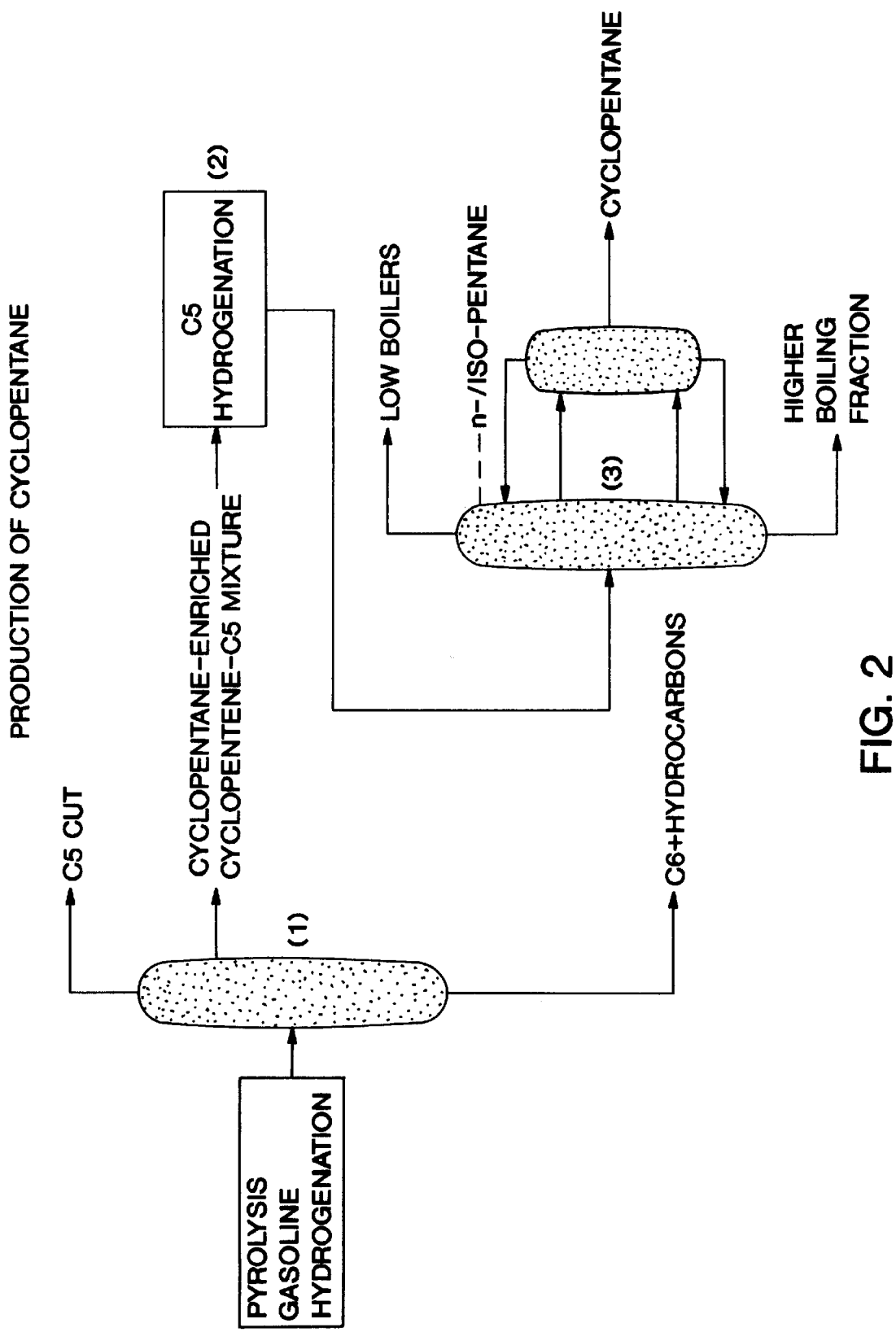
FIGS. 2 to 3 show the schematic course of the novel process, the concluding fractional distillation of the $C_5$ hydrocarbon mixture obtained in the catalytic hydrogenation (2) being performed in thermally coupled columns (3). The procedure described in FIG. 1 can be modified in such a manner that the second column is connected to the enrichment and stripping parts of the first column, gas- and liquid-side connections being made in each case. The energy consumption can be decreased in this manner and separate reboilers and possibly condensers can be saved. In this case, cyclopentane is again taken off from the second column as a sidestream. The n-/isopentane mixture, depending on the procedure, is taken off as a liquid sidestream from the first or the second column.
Figure 3:
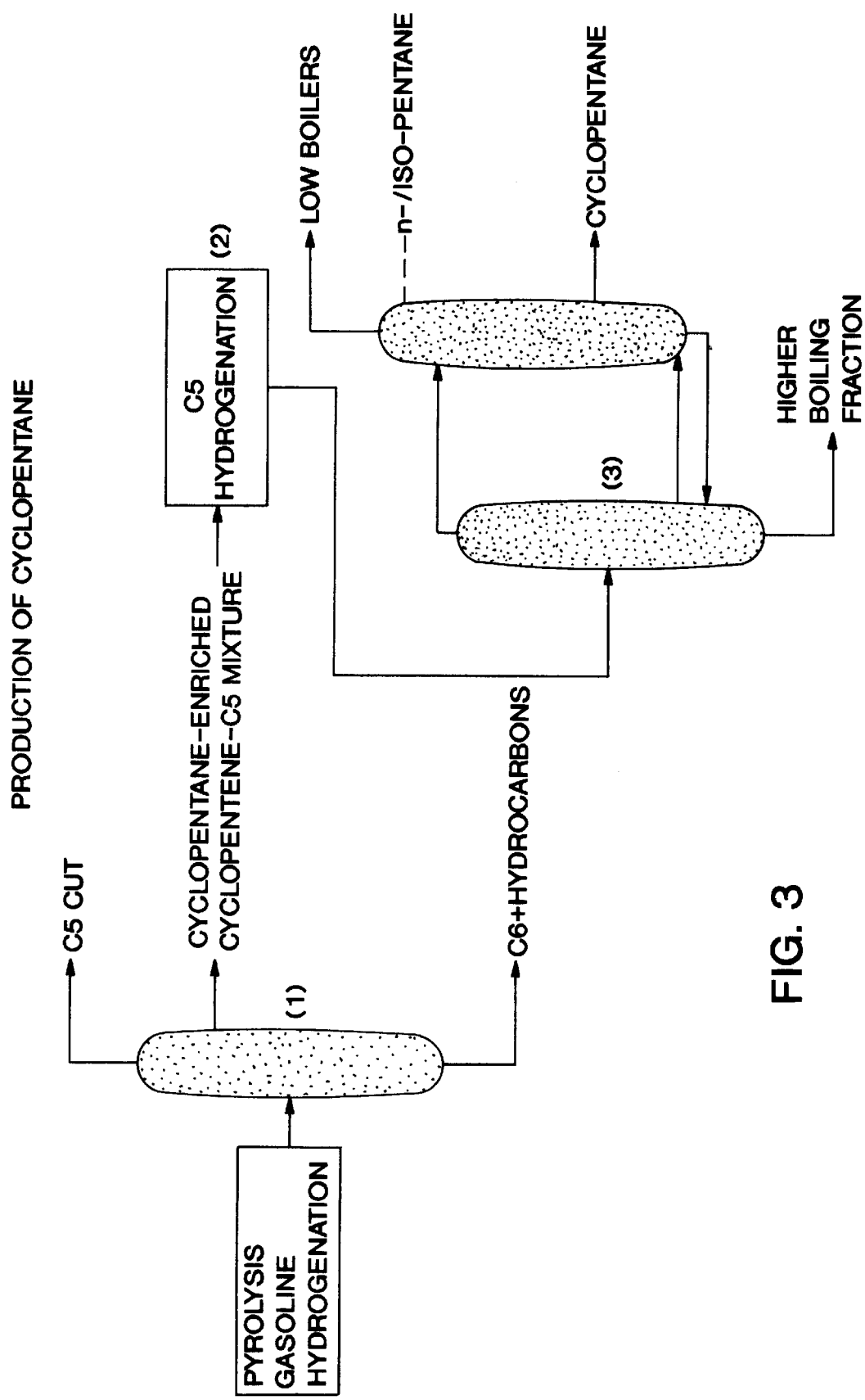
Figure 4:
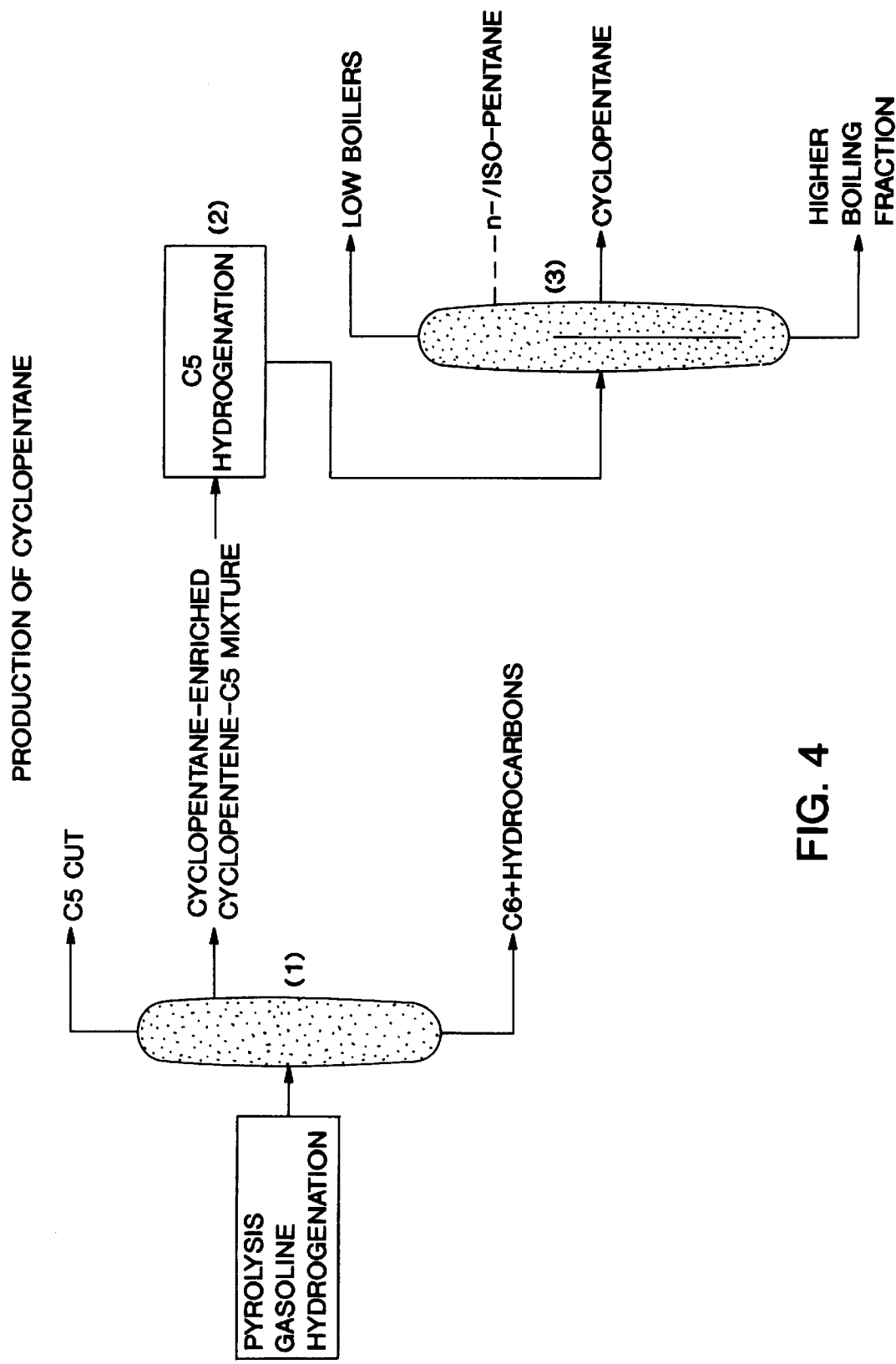
FIG. 4 shows the schematic course of the novel process, the concluding fractional distillation of the $C_5$ hydrocarbon mixture obtained in the catalytic hydrogenation (2) being performed in a divided wall column (3). The object of distillation can be achieved by fractionating the hydrogenated $C_5$ mixture by means of a divided wall column into the desired fractions of low boilers, n-/isopentane if appropriate, cyclopentane and higher boilers.

What is claimed is:

1. A process for producing cyclopentane and cyclopentene from pyrolysis gasoline, which comprises
   (a) first partially hydrogenating the pyrolysis gasoline to convert dienes and acetylenes present therein selectively into the corresponding alkanes and alkenes,
   (b) subsequently separating the partly hydrogenated pyrolysis gasoline in a first distillation column, said distillation column having a bottom take off and a top take off wherein the partly hydrogenated pyrolysis gasoline is fed into the first distillation column at a point between the bottom takeoff and the top takeoff, into
   $b_1$) a top fraction comprising $C_3$ and $C_4$ hydrocarbons which top fraction is taken off at the top takeoff of the first distillation column,
   $b_2$) a side stream faction comprising at least 40% by weight of cyclopentane and cyclopentene which side stream fraction is taken off at a suitable tray between the top takeoff and the bottom takeoff of the first distillation column, and
   $b_3$) a bottom fraction consisting essentially of $C_6$ hydrocarbons and higher boiling components of the partially hydrogenated gasoline which bottom fraction is taken off at the bottom takeoff of the first distillation column, and
   (c) finally isolating a mixture of cyclopentane and cyclopentene from the side stream fraction by fractional distillation in a second distillation column, said second distillation column having a bottom take off and a top take off and the side stream fraction being fed into the column at a point of the second column between the bottom takeoff and the top takeoff.

2. The process defined in claim 1, wherein the side stream fraction is taken off as a liquid at a tray from about 5 trays below the top takeoff to about 5 trays above the feed entry point.

3. The process defined in claim 1, wherein the side stream fraction is taken off as a liquid at a tray from about 10 trays below the top takeoff to about 10 trays above the feed entry point.

4. The process defined in claim 1, wherein the first distillation column is a column having about 60 trays and wherein the partially hydrogenated pyrolysis gasoline is fed into said distillation column at about tray 30 and the side stream fraction is taken off as a liquid at about tray 45.

5. The process defined in claim 1, wherein the concluding fractional distillation is carried out in two coupled distillation columns.

6. The process defined in claim 1, wherein the second distillation column is a divided wall column.

7. A process for producing cyclopentane from pyrolysis gasoline, which comprises
   (a) first partially hydrogenating the pyrolysis gasoline to convert dienes and acetylenes present therein selectively into the corresponding alkanes and alkenes,
   (b) subsequently separating the partly hydrogenated pyrolysis gasoline in a first distillation column, said distillation column having a bottom take off and a top take off wherein the partly hydrogenated pyrolysis gasoline is fed into the first distillation column at a point between the bottom takeoff and the top takeoff, into
   $b_1$) a top fraction comprising $C_3$ and $C_4$ hydrocarbons which top fraction is taken off at the top takeoff of the first distillation column,
   $b_2$) a side stream fraction comprising at least 40% by weight of cyclopentane and cyclopentene which side stream fraction is taken off at a suitable tray between the top takeoff and the bottom takeoff of the first distillation column, and
   $b_3$) a bottom fraction consisting essentially of $C_6$ hydrocarbons and higher boiling components of the partially hydrogenated gasoline which bottom fraction is taken off at the bottom takeoff of the first distillation column, and is thereafter catalytically hydrogenating the side stream fraction, and (c) finally isolating cyclopentane from the hydrogenated side stream fraction by fractional distillation in a second distillation column, said second distillation column having a bottom take off and a top take off and the hydrogenated side stream fraction being fed into the column at a point between the bottom takeoff and the top takeoff.

8. The process defined in claim 7, wherein in the fractional distillation subsequent to the catalytic hydrogenation, an n-/isopentane mixture is additionally isolated.

9. The process defined in claim 8, wherein the n-/isopentane mixture is isolated as a liquid sidestream at from about 10 trays below the top takeoff to about 10 trays above the feed entry point.

10. The process defined in claim 8, wherein the n-/isopentane mixture is isolated as a liquid sidestream at from about 15 trays below the top takeoff to about 15 trays above the feed entry point.

11. The process defined in claim 8, wherein the second distillation column is a column having about 70 trays and wherein the catalytically hydrogenated side stream fraction is fed into the distillation column at about tray 25 and the n-/isopentane mixture is isolated as a liquid sidestream at about tray 45.

12. The process defined in claim 7, wherein the side stream fraction is taken off from the first distillation column as a liquid sidestream at from about 5 trays below the top takeoff to about 5 trays above the feed entry point.

13. The process defined in claim 7, wherein the side stream fraction is taken off from the first distillation column as a liquid sidestream at from about 10 trays below the top takeoff to about 10 trays above the feed entry point.

14. The process defined in claim 7, wherein the first distillation column is a column having about 60 trays and wherein the partially hydrogenated pyrolysis gasoline is fed into the distillation column at about tray 30 and the side stream fraction is taken off as a liquid sidestream at about tray 45.

15. The process defined in claim 7, wherein the concluding fractional distillation is carried out in two coupled distillation columns.

16. The process defined in claim 7, wherein the second distillation column is a divided wall column.

* * * * *

UNITED STATES PATENT AND TRADEMARK OFFICE
CERTIFICATE OF CORRECTION

PATENT NO. : 6,153,804
DATED : November 28, 2000
INVENTOR(S) : Kanne et al.

Page 1 of 1

It is certified that error appears in the above-identified patent and that said Letters Patent is hereby corrected as shown below:

Column 4, claim 1,
Line 9, "faction" should be -- fraction --.

Signed and Sealed this

Twenty-fifth Day of September, 2001

Attest:

NICHOLAS P. GODICI
Attesting Officer    Acting Director of the United States Patent and Trademark Office